United States Patent
Zaifuddin et al.

(10) Patent No.: US 11,277,717 B2
(45) Date of Patent: Mar. 15, 2022

(54) MOBILE TERMINATING CALL RETRY LOGIC FOR MULTIPLE RADIO ACCESS TECHNOLOGY TYPES

(71) Applicant: T-Mobile USA, Inc., Bellevue, WA (US)

(72) Inventors: Sabuhi Kiran Zaifuddin, Bellevue, WA (US); Shujaur Rehman Mufti, Snoqualmie, WA (US); Saqib Badar, Bellevue, WA (US)

(73) Assignee: T-Mobile USA, Inc., Bellevue, WA (US)

(*) Notice: Subject to any disclaimer, the term of this patent is extended or adjusted under 35 U.S.C. 154(b) by 55 days.

(21) Appl. No.: 16/694,628

(22) Filed: Nov. 25, 2019

(65) Prior Publication Data

US 2021/0160666 A1    May 27, 2021

(51) Int. Cl.
*H04W 4/16* (2009.01)
*H04W 40/24* (2009.01)
*H04W 76/19* (2018.01)
*H04W 8/04* (2009.01)

(52) U.S. Cl.
CPC ............ *H04W 4/16* (2013.01); *H04W 8/04* (2013.01); *H04W 40/24* (2013.01); *H04W 76/19* (2018.02)

(58) Field of Classification Search
CPC ......... H04W 4/16; H04W 76/19; H04W 8/04; H04W 40/24; H04W 48/18; H04W 8/12; H04W 40/02; H04L 65/1046; H04L 45/04; H04L 65/1069; H04L 65/1016; H04L 65/1063; H04L 65/1073; Y02D 30/00
See application file for complete search history.

(56) References Cited

U.S. PATENT DOCUMENTS

| | | | | |
|---|---|---|---|---|
| 2012/0269117 | A1* | 10/2012 | Hu | H04L 65/1046 370/328 |
| 2013/0329647 | A1* | 12/2013 | Keller | H04W 8/04 370/328 |
| 2016/0262058 | A1* | 9/2016 | Jeong | H04W 60/00 |
| 2016/0309374 | A1* | 10/2016 | Shu | H04W 36/14 |
| 2016/0337898 | A1* | 11/2016 | Jeong | H04W 12/041 |
| 2019/0174003 | A1* | 6/2019 | Chandramouli | H04L 65/1016 |
| 2020/0015128 | A1* | 1/2020 | Stojanovski | H04W 36/0022 |
| 2020/0336517 | A1* | 10/2020 | Qiao | H04L 61/2007 |

\* cited by examiner

*Primary Examiner* — Dai Phuong
(74) *Attorney, Agent, or Firm* — Lee & Hayes, P.C.

(57) ABSTRACT

An Internet Protocol Multimedia Subsystem (IMS) application server can initially attempt to route a terminating call invite to a user equipment (UE) via a packet-switched (PS) domain radio access network (RAN). However, if that initial attempt fails, the application server can follow either a PS retry option to reattempt routing the terminating call invite via a PS-domain RAN, or a circuit-switched (CS) retry option to instead reattempt routing the terminating call invite via a CS-domain RAN. In some examples, if Home Subscriber Server (HSS) data indicates that the UE is connected to a Long-Term Evolution (LTE) RAN and that CS-domain location information for the UE is older than a threshold, the application server can enable the PS retry option. However, if the UE is connected to an LTE RAN but the CS-domain location information is more recent than the threshold, the application server can instead enable the CS retry option.

20 Claims, 4 Drawing Sheets

MOBILE TERMINATING CALL RETRY LOGIC FOR MULTIPLE RADIO ACCESS TECHNOLOGY TYPES

BACKGROUND

Many newer radio access networks (RANs), such as Long-Term Evolution (LTE) and fifth generation (5G) RANs, use radio access technology (RAT) types that are in a packet-switched (PS) domain. However, some older RANs, such as second generation (2G) and third generation (3G) RANs, use RAT types that are in a circuit-switched (CS) domain.

Although newer RANs generally use PS-domain RAT types, telecommunication network operators may continue to operate older RANs that use CS-domain RAT types. Accordingly, user equipment (UE) that support both PS-domain and CS-domain RAT types may be able to connect to a telecommunication network using either, or both, PS-domain and CS-domain RAT types.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Introduction

A user equipment (UE), such as a mobile phone or other communications device, can connect to a telecommunication network through one or more radio access networks (RANs). Some RANs use packet-switched (PS) radio access technology (RAT) types, and can thus be in a PS-domain. For example, RANs for Long-Term Evolution (LTE) and fifth generation (5G) networks can be PS-domain RANs. However, other RANs use circuit-switched (CS) RAT types, and can thus be in a CS-domain. For example, RANs for older second generation (2G) and third generation (3G) networks can be CS-domain RANs.

When some PS RAT types were first developed, many telecommunication network providers began deploying PS-domain RANs while continuing to maintain and operate older CS-domain RANs. For example, when PS-domain LTE networks were developed, many network providers began deploying LTE network hardware and infrastructure while continuing to maintain older CS-domain hardware and infrastructure for 2G and/or 3G networks. This process ensured that older UEs that only supported CS RAT types could continue to connect to telecommunication networks, and also allowed UEs that supported both CS and PS RAT types to connect to telecommunication networks via either, or both, CS-domain RANs or PS-domain RANs. For example, a UE that supported both CS and PS RAT types could be configured to attempt to connect via a PS-domain RAN, but also be able to fall back to connecting via a legacy CS-domain RAN if a PS-domain connection was unsuccessful or unavailable.

As another example, when a telecommunication network could not successfully route an incoming call to a UE via a PS-domain RAN, the telecommunication network could retry routing the incoming call to the UE via a CS-domain RAN. In many networks, UEs were configured to perform "combined attach" procedures such that the UEs would, by default, always attempt to establish connections via both a legacy CS-domain RAN and a newer PS-domain RAN. Accordingly, if an initial attempt to connect an incoming call via a PS-domain RAN failed, many telecommunication networks were configured to always attempt a CS-domain retry of the incoming call under the assumption that the UE would likely also be connected via a CS-domain RAN.

However, as PS-domain coverage has increased over time and more and more UEs are compatible with PS RAT types, there may be less of an incentive or need for many network providers to continue maintaining CS-domain coverage. For example, some UEs that support 5G may be configured to fall back from 5G to LTE if necessary and thereby stay on a PS-domain RAT type, but these UEs may rarely, if ever, be configured to fall back to 3G or other CS-domain RAT types. As another example, as providers have heavily invested in deploying PS-domain RANs for 5G and/or LTE connections, in many areas the increased PS-domain coverage has led to a decrease in the number of UE connections via CS-domain RANs due to sufficient PS-domain coverage in those areas. For these and other reasons, some network providers may be decommissioning CS-domain RANs in at least some areas.

As discussed above, some existing telecommunications networks are configured to always attempt a CS-domain retry of an incoming call when the incoming call cannot be connected to a terminating UE via a PS-domain RAN, under the assumption that the UE would likely also have CS-domain coverage. However, because CS-domain RANs may now be decommissioned in some areas, that assumption may no longer apply and UEs may often be in locations that only have PS-domain coverage. As such, CS-domain retry procedures may be unlikely to succeed in many situations. Accordingly, even if a telecommunication network is initially unable to connect an incoming call to a terminating UE via PS-domain RAN, a PS-domain retry may still be more likely to succeed than the default CS-domain retry used in previous systems, particularly when the UE is in a location that is not covered by a CS-domain RAN.

For example, an initial attempt to connect an incoming call to a terminating UE via a PS-domain RAN may fail if a terminating call invite message was routed to a first base station the terminating UE had previously been attached to, but due to a handover operation the terminating UE has moved to attach to a second base station. In this situation, the first base station may no longer be able to deliver the terminating call invite message to the terminating UE, and the call setup can fail. However, if thereafter the terminating UE has a PS-domain connection to the second base station, but has no CS-domain connection, retrying delivery of the terminating call invite message to the terminating UE via the PS-domain may succeed while retrying delivery of the terminating call invite message to the terminating UE via the CS-domain would fail.

However, in other situations in which a terminating UE does have CS-domain coverage, a CS-domain retry may still be successful more often on average than a PS-domain retry. For instance, a terminating UE may be in an area where LTE equipment has not been deployed, has failed, or is overloaded, but 3G equipment is still deployed and working properly. Accordingly, although the telecommunication may initially attempt to connect an incoming call to the terminating UE via a PS-domain RAN, if that initial PS-domain attempt fails a CS-domain retry may be more likely to succeed than a PS-domain retry in this situation.

Described herein are systems and methods by which a telecommunication network can determine whether to perform a terminating call retry attempt via a PS-domain RAN or a CS-domain RAN. As will be described below, the telecommunication network can decide between using a PS-domain RAN or a CS-domain RAN for a terminating call retry attempt based on a RAT type of a RAN that a terminating UE is registered with, based on an age value of location information associated with a registration on a CS-domain RAN, and/or based on other factors.

Example Environment

Figure 1:
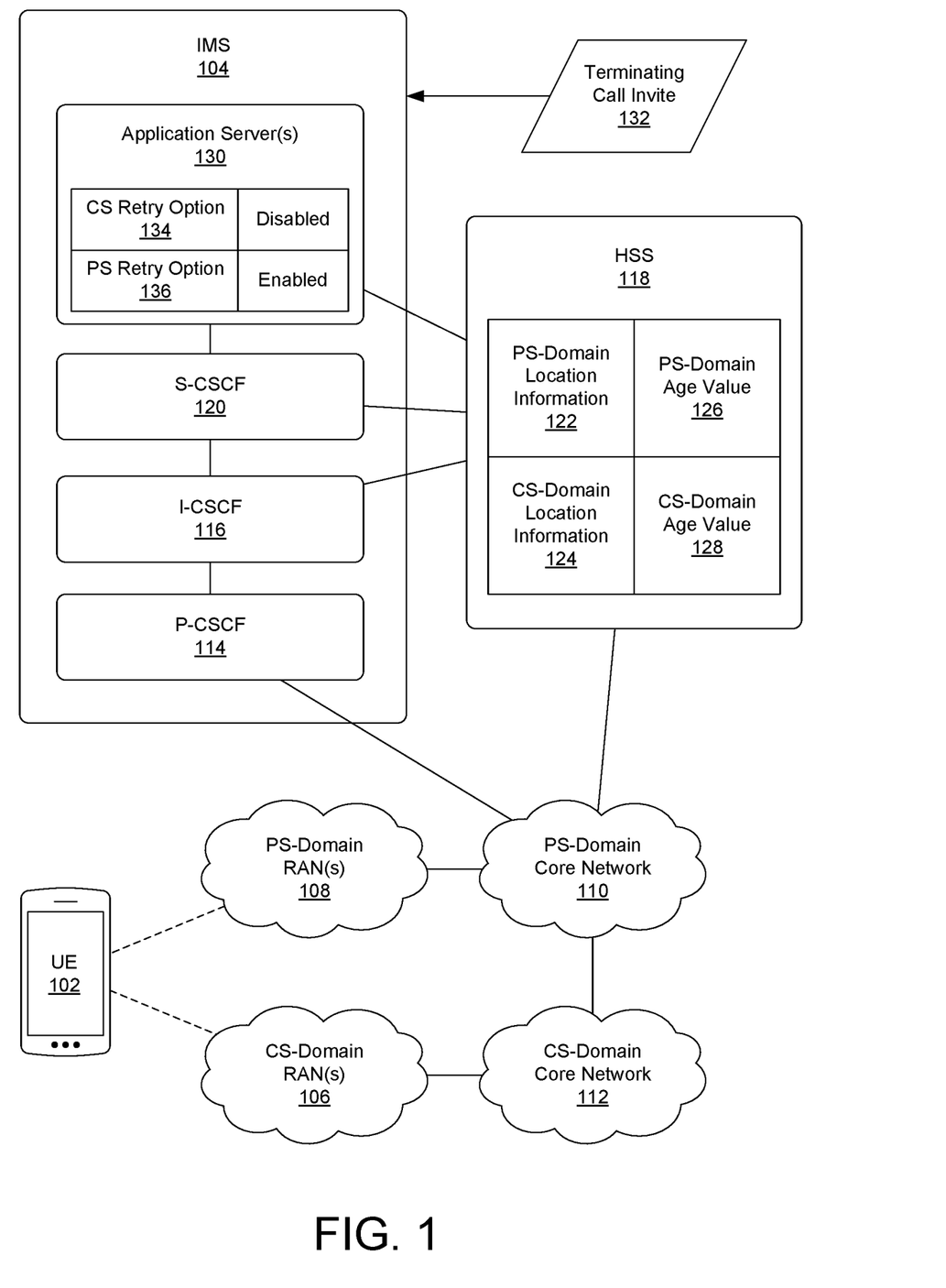
FIG. 1 depicts an example network environment in which user equipment (UE) can connect to a telecommunication network.

FIG. 1 depicts an example network environment in which user equipment (UE) 102 can connect to a telecommunication network to engage in communication sessions for voice calls, video calls, or any other type of communication. A UE 102 can be any device that can wirelessly connect to the telecommunication network to engage in calls or other types of communications. In some examples, a UE 102 can be a mobile phone, such as a smart phone or other cellular phone. In other examples, a UE 102 can be any other type of device that can engage in calls or other types of communications, including a personal digital assistant (PDA), a personal computer (PC) such as a laptop, desktop, or workstation, a media player, a tablet, a gaming device, a smart watch, or any other type of computing or communication device.

A UE 102 can connect to at least one radio access network (RAN), which can in turn connect the UE 102 to a core network of a telecommunication network, an IP Multimedia Subsystem (IMS) 104, the Internet, and/or other networks. Different RANs can use different radio access technology (RAT) types. RAT types can include Wi-Fi®, Global System for Mobile Communications (GSM), Universal Mobile Telecommunications System (UMTS), Long-Term Evolution (LTE), fifth generation (5G) New Radio (NR), and other RAT types.

Some RANs can be circuit-switched (CS) domain RANs 106. CS-domain RANs 106 use a RAT type that transports data using dedicated circuits. For example, many second generation (2G) networks and third generation (3G) networks, such as GSM networks or UMTS Terrestrial Radio Access Network (UTRAN) networks, can be CS-domain RANs 106.

Other RANs can be packet-switched (PS) domain RANs 108. PS-domain RANs 108 use a RAT type that divides data into data packets, such as Internet Protocol (IP) packets, that can be transmitted separately. For example, rather than establishing a dedicated circuit for a voice call, voice call data can be transmitted in data packets using Voice over IP (VoIP) technology in a PS-domain RAN 108. For example, many fourth generation (4G) networks and 5G networks, such as LTE Evolved-UTRAN (E-UTRAN) and 5G nextgeneration RAN (NG-RAN) networks, can be PS-domain RANs 108. Wi-Fi access networks and other packet-based access networks can also be PS-domain RANs 108.

A UE 102 can attach to one or more RANs, including CS-domain RANs 106 and/or PS-domain RANs 108, via base stations or other types of access points. For example, a UE 102 can attach to a UTRAN network via a base station known as a Node B (NB), to a E-UTRAN network via a base station known as an evolved Node B (eNB), to a 5G NG-RAN via a base station known as a gNB, or to a Wi-Fi access network via a Wi-Fi access point. In various examples, or at different times, a UE 102 may be connected to a telecommunication network via one or more CS-domain RANs 106, one or more PS-domain RANs 108, or a combination of one or more CS-domain RANs 106 and one or more PS-domain RANs 108.

A UE 102 that has attached to at least one RAN can connect through the RAN to an IMS 104. In some examples, the RAN can be connected to a core network that is in turn directly or indirectly connected to the IMS 104. A PS-domain RAN 108 can be connected to a PS-domain core network 110 that includes one or more nodes or elements, at least one of which can be linked to the IMS 104. For example, when a UE 102 connects to an eNB of a PS-domain LTE E-UTRAN, the eNB can in turn connect the UE 102 to PS-domain core network 110, such as an LTE evolved packet core (EPC) network, that includes a gateway connected to the IMS 104. A CS-domain RAN 106 can similarly be connected to a CS-domain core network 112 that includes one or more nodes or elements, at least one of which can be directly, or indirectly, linked to the IMS 104. For example, when a UE 102 connects to a NB of a 3G RAN, the 3G RAN may itself be connected to a CS-domain core network 112, such as a 3G core network. In some examples, a node or other element of the CS-domain core network 112 can be connected to a PS-domain core network 110, through which the CS-domain core network 112 can reach the IMS 104. In other examples, the CS-domain core network 112 can be directly connected to the IMS 104.

The IMS 104 can include Call Session Control Functions (CSCFs) that can register UEs 102 with the IMS 104, manage communication sessions, and perform other functions. For example, when a UE 102 attaches to a telecommunication network, an IMS registration process can occur. During IMS registration, the UE 102 can send a registration message to a Proxy CSCF (P-CSCF) 114 in the IMS 104. The P-CSCF 114 can forward the registration message to an Interrogating CSCF (I-CSCF) 116, which can communicate with a Home Subscriber Server (HSS) 118 to select a Serving CSCF (S-CSCF) 120 for the UE 102. The I-CSCF 116 can forward the registration message to the selected S-CSCF 120, and the S-CSCF 120 can authenticate the UE 102 with the HSS 118. Following registration of the UE 102 with the IMS 104, the S-CSCF 120 can also route messages, such as Session Initiation Protocol (SIP) messages, associated with communication sessions for the UE 102.

The HSS 118 can include a database of user profile information associated with UEs 102. For example, the HSS 118 can store user profiles for subscribers, location information, and/or other information about users associated with UEs 102. The HSS 118 can also be involved in authentication and/or authorization of users and/or UEs 102 in the IMS 104. The HSS 118 can communicate with other network elements using Diameter protocol interfaces or other types of connections. In some examples, the HSS 118 can considered to be part of the IMS 104. In other examples, the HSS 118 can be considered to part of a core network or otherwise be considered to be outside the IMS 104 itself. For instance, in some examples the HSS 118 can be considered part of a PS-domain core network 110, such as an LTE packet core network. In other examples, the HSS 118 described herein can instead be one or more other elements that perform functions similar to a home subscriber server, such as network functions of a 5G core network including an Authentication Server Function (AUSF) and/or Unified Data Management (UDM) element.

The HSS 118 can maintain PS-domain location information 122 about a last known location for a UE 102 in the PS-domain, as well as CS-domain location information 124 about a last known location for the UE 102 in the CS-domain. The HSS 118 can also maintain records about corresponding RAT-types that the UE 102 has used to connect to the telecommunication network in the PS-domain and CS-domain. When a UE 102 attaches via a PS-domain RAN 108 to a PS-domain core network 110, an element of the PS-domain core network 110 can inform the HSS 118 of the UE's location. For example, when a UE 102 attaches to a PS-domain LTE eNB, the UE 102 can send a Tracking Area Update (TAU) message to a Mobility Management Entity (MME) in the LTE core network. The TAU message can indicate a current location of the UE 102, such as by identifying a network Tracking Area (TA) where the UE 102 is currently located. Based on that information, the MME can send a location update message to the HSS 118 that informs the HSS 118 of the latest location for the UE 102 known to the PS-domain RAN 108. The location update message may also indicate identifiers associated with the UE 102, such as an international mobile subscriber identity (IMSI) and/or international mobile equipment identity (IMEI), and/or identify a RAT-type associated with the UE's connection. Based on receiving a location update message for a UE 102 from an MME associated with a PS-domain RAN 108, the HSS 118 can accordingly add, or update, PS-domain location information 122 and/or other user profile data for the UE 102 associated with a PS-domain connection for the UE 102.

If the UE 102 is also attached to a CS-domain RAN 106 when it sends a TAU message to an MME of a PS-domain core network 110, the MME can also provide a location update message to an element of a CS-domain core network 112, such as a Mobile Switching Centre/Visiting Location Register (MSC/VLR) or Mobile Switching Station (MSS). The MSC/VLR, or other element of the CS-domain core network 112, can then also provide corresponding location update information to the HSS 118 that identifies for the latest known location for the UE 102, identifiers associated with the UE 102, a RAT-type associated with the UE's connection, and/or other information. In some examples, the HSS 118 may similarly receive CS-domain location information 124 about a UE 102 from a CS-domain core network 112 if a UE 102 directly provides new or updated location information to the CS-domain core network 112. The HSS 118 can respond to receiving such CS-domain location information 124 by adding, or updating, CS-domain location information 124 and/or other user profile data for the UE 102 associated with a CS-domain connection for the UE 102.

In some examples, an HSS 118 can maintain previously stored PS-domain location information 122 and/or CS-domain location information 124 about a UE 102 even after the UE 102 has detached from a corresponding PS-domain RAN 108 or a corresponding CS-domain RAN 106. For instance, although a UE 102 may detach from a PS-domain RAN 108, the UE 102, the PS-domain RAN 108, and/or a PS-domain core network 110 may not necessarily inform the HSS 118 that the UE 102 is no longer attached to the PS-domain RAN 108. As an example, the UE 102 may not inform the PS-domain core network 110 that it is detaching from the PS-domain RAN 108, and as such the PS-domain core network 110 and the HSS 118 may be unaware that the UE 102 has detached from its PS-domain connection. In these situations, the HSS 118 can continue to store previous PS-domain location information 122 until the UE 102 reconnects to a PS-domain RAN 108 and provides location update information that the HSS 118 can use to update its PS-domain location information 122 for the UE 102.

Accordingly, the HSS 118 can also maintain a PS-domain age value 126 of the PS-domain location information 122 and a CS-domain age value 128 of the CS-domain location information 124 associated with a UE 102, to reflect when the PS-domain location information 122 and the CS-domain location information 124 were last added or updated. For example, if a UE 102 is attached to both a PS-domain RAN 108 and a CS-domain RAN 106 and provides a location update at a first point in time, the HSS 118 can update the PS-domain age value 126 and the CS-domain age value 128 associated with the UE 102 to reflect that first point in time. However, if the UE 102 later attaches at a second point in time only via a PS-domain RAN 108 such that the PS-domain location information 122 changes at the second point in time, the HSS 118 can accordingly update the PS-domain age value 126 of the PS-domain location information 122 for the UE 102 based on the second point in time, but continue to base the CS-domain age value 128 of the CS-domain location information 124 for the UE 102 on the first point in time. In this situation, the PS-domain age value 126 and the CS-domain age value 128 maintained by the HSS 118 can indicate that the CS-domain location information 124 for the UE 102 is older than, and has a greater age value than, the PS-domain location information 122 for the UE 102.

The IMS 104 can also include application servers 130 that provide services for the communication sessions, such as services for voice calls, video calls, or other types of communications. For example, the IMS 104 can have one or more application servers 130 including a telephony application server (TAS) and/or a Service Centralization and Continuity Application Server (SCC-AS) that provides or assists with telephony services, such as services for voice and/or video calls. In some examples, an SCC-AS can be part of a TAS. In other examples, a TAS can be linked to a separate SCC-AS in in the IMS 104. An example system architecture for an application server 130 is illustrated in greater detail in FIG. 3, and is described in detail below with reference to that figure.

When an originating device attempts to place a call to a terminating UE 102, such as the UE 102 shown in FIG. 1, a terminating call invite 132 can be routed from the originating device through one or more networks to the IMS 104 associated with the terminating UE 102. For example, the terminating call invite 132 can be a SIP INVITE message. The terminating call invite 132 can, for example, be received through an I-CSCF 116 and/or S-CSCF 120 of the IMS 104 and be forwarded to an application server 130 of the IMS 104, such as a TAS and/or SCC-AS. The application server 130 can then at least attempt to route the terminating call invite 132 from the IMS 104 to the terminating UE 102 via a RAN so that the call can be connected. For example, the application server 130 can attempt to route a terminating call invite 132 to a terminating UE 102 by instructing one or more CSCFs of the IMS 104, and/or other network elements, to route the terminating call invite 132 to the terminating UE 102 via either a PS-domain RAN 108 or a CS-domain RAN 106, in some cases via one or more intervening core networks.

However, the application server 130 may not have up-to-date information about which RAN the terminating UE 102 is currently connected to, or whether the terminating UE 102 is currently connected to a CS-domain RAN 106 or a PS-domain RAN 108. For example, although the application server 130 may have been provided with RAN information about a UE 102 when the UE 102 initially registered with the IMS 104, that RAN information provided during IMS registration may now be stale. Accordingly, an application server 130, such as an SCC-AS, can obtain Terminating Access Domain Selection (T-ADS) information from the HSS 118 about RANs that the terminating UE 102 has attached to, and/or the RAT types associated with such RANs. The application server 130 can, based at least in part on the T-ADS information, determine whether the terminating call invite 132 should be routed to the terminating UE 102 via a CS-domain RAN 106 or a PS-domain RAN 108.

However, in some cases an initial attempt to route a terminating call invite 132 to a terminating UE 102 via a selected RAN can still fail. For instance, if the application server 130 chose to attempt to route a terminating call invite 132 to a terminating UE 102 via a PS-domain RAN 108, the terminating call invite 132 can be routed through the PS-domain RAN 108 and one or more base stations or other access points of the PS-domain RAN 108 can broadcast paging messages for the terminating UE 102 indicating that the PS-domain RAN 108 has a terminating call invite 132 for the terminating UE 102. If the terminating UE 102 does not respond or attach to the PS-domain RAN 108 to receive the terminating call invite 132 within a threshold number of paging cycles, the application server 130 can consider the attempt to route the terminating call invite 132 via the PS-domain RAN 108 to have failed. For example, if a paging cycle normally takes five seconds, the application server 130 can be configured to consider delivery of a terminating call invite 132 to have failed after twelve seconds, enough time for two paging cycles to have completed in the PS-domain RAN 108 with no response. In other examples, the application server 130 can be configured to consider delivery of a terminating call invite 132 to have failed based on any other number of paging cycles and/or any other time period.

When an initial attempt to route a terminating call invite 132 to a terminating UE 102 fails over a PS-domain RAN 108, the application server 130 can be configured to retry routing the terminating call invite 132 to the terminating UE 102 at least one more time. However, during the retry, the application server 130 can choose to attempt to route the terminating call invite 132 to the terminating UE 102 over a PS-domain RAN 108 again, or instead attempt to route the terminating call invite 132 to the terminating UE 102 over a CS-domain RAN 106. The application server 130 can accordingly have a flag, setting, or other parameter that indicates that the application server 130 should use either a CS retry option 134 or a PS retry option 136 in the event that an initial attempt to route a terminating call invite 132 fails via a PS-domain RAN 108.

For example, if the CS retry option 134 is enabled at the application server 130 and an initial attempt to route a terminating call invite 132 to a terminating UE 102 fails via a PS-domain RAN 108, the application server 130 can retry routing the terminating call invite 132 to the terminating UE 102 at least once via a CS-domain RAN 106 instead of via a PS-domain RAN 108. Accordingly, when the CS retry option 134 is enabled at the application server 130, the PS retry option 136 can be disabled such that the application server 130 would not attempt to route the terminating call invite 132 to the terminating UE 102 via a PS-domain RAN 108 during the retry.

However, if the PS retry option 136 is enabled at the application server 130 and an initial attempt to route a terminating call invite 132 to a terminating UE 102 fails via a PS-domain RAN 108, the application server 130 can retry routing the terminating call invite 132 to the terminating UE 102 at least once more via a PS-domain RAN 108. Accordingly, when the PS retry option 136 is enabled at the application server 130, the CS retry option 134 can be disabled such that the application server 130 would not attempt to route the terminating call invite 132 to the terminating UE 102 via a CS-domain RAN 106 during the retry.

In some examples, if the application server 130 chooses to initially attempt to route the terminating call invite 132 via a CS-domain RAN 106, or follows a CS retry option 134 during a retry attempt after a failed initial attempt to connect an incoming call using a PS-domain RAN 108, the application server 130 can generate a circuit-switched routing number (CSRN) for the terminating UE 102, or obtain a CSRN for the terminating UE 102 from the HSS 118, and can use that CSRN to route the terminating call invite 132 or a corresponding call setup message towards the terminating UE 102 via a CS-domain RAN 106.

Figure 2:
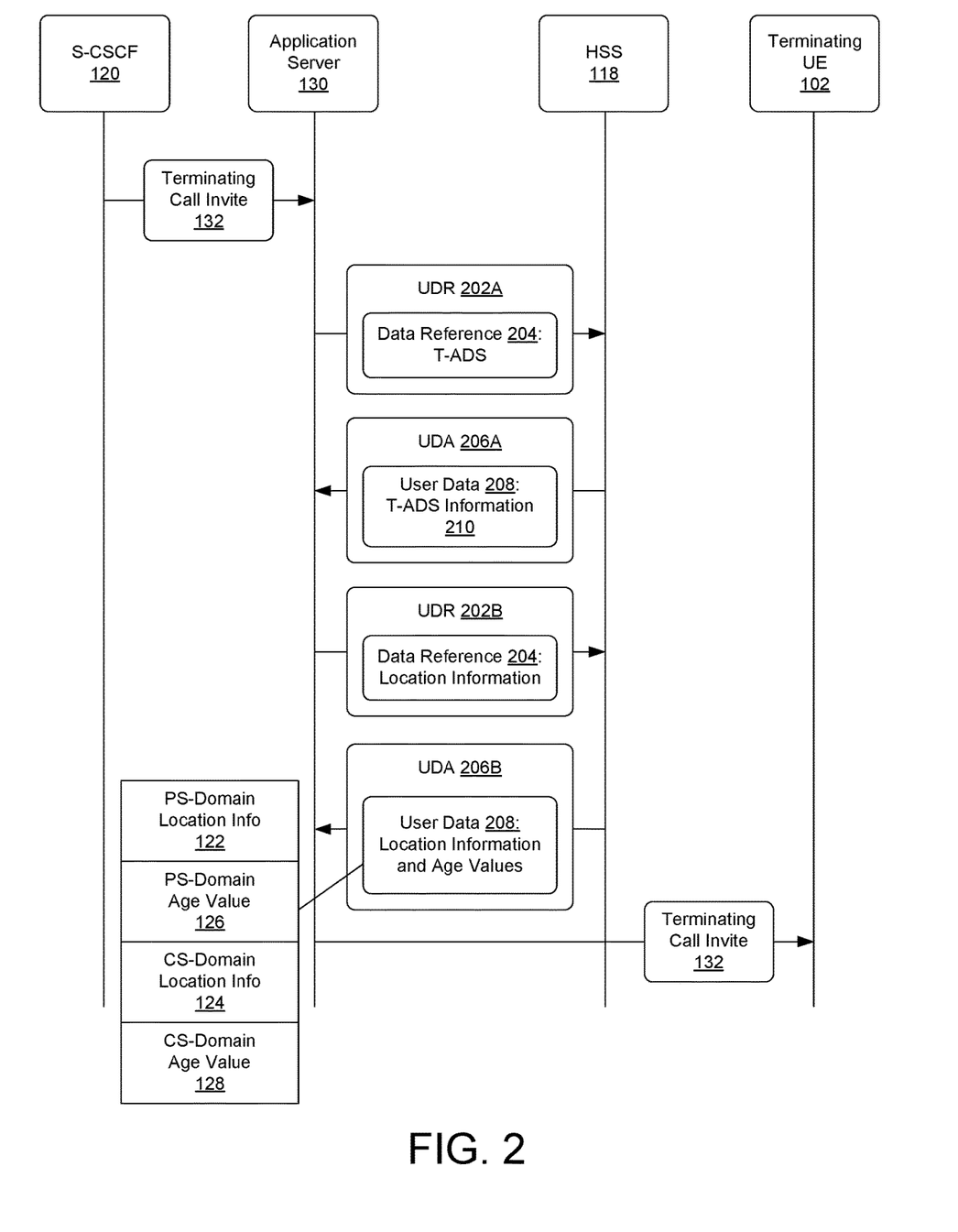
FIG. 2 depicts a sequence of messages that can be exchanged between a Serving Call Session Control Functions (S-CSCF), one or more application servers, and a Home Subscriber Server (HSS).

FIG. 2 depicts a sequence of messages that can be exchanged between an S-CSCF 120, one or more application servers 130, and an HSS 118. Using messages shown in FIG. 2, an application server 130 can obtain user data associated with a terminating UE 102 from the HSS 118. The application server 130 can then use the user data obtained from the HSS 118 to determine whether to initially attempt to route a terminating call invite 132 to the terminating UE 102 via a CS-domain RAN 106 or a PS-domain RAN 108. The application server 130 can also use the user data obtained from the HSS 118 to determine whether to enable a CS retry option 134 or a PS retry option 136 for a potential retry attempt to route the terminating call invite 132 to the terminating UE 102.

As shown in FIG. 2, an application server 130 in an IMS 104 can receive a terminating call invite 132, such as a SIP INVITE message, from an S-CSCF 120 or other network element. The terminating call invite 132 can be associated with an incoming call for a terminating UE 102. The terminating call invite 132 can include one or more identifiers for the terminating UE 102 and/or a user associated with the terminating UE 102. In some examples, the application server 130 shown in FIG. 2 can be a TAS and/or an SCC-AS.

In response to receiving the terminating call invite 132, the application server 130 can send one or more User Data Request (UDR) messages 202 to the HSS 118 to request data from a user profile associated with the UE 102. For example, the application server 130 can use a Diameter protocol Sh interface to send a UDR message 202 to the HSS 118 to request information about a UE 102 or an associated subscriber. Each UDR message 202 can include one or more data reference elements 204 that identify specific types of information that the application server 130 is requesting from the HSS 118. For example, a data reference element 204 can be included as an attribute-value pair (AVP) of a UDR message 202, with an attribute name identifying itself as a data reference element 204 and a value indicating a type of information being requested. The HSS 118 can respond to each UDR message 202 by returning a corresponding User Data Answer (UDA) message 206 to the application server 130. For example, the HSS 118 can return a UDA message 206 to the application server 130 via the Diameter protocol Sh interface. Each UDA message 206 can contain user data 208 associated with a type of information requested by a corresponding UDR message 202.

For example, the application server 130 can send the HSS 118 a first UDR message 202A that includes a data reference element 204 indicating that the application server 130 is requesting T-ADS information 210 about RANs that the terminating UE 102 has attached to, and/or the RAT types associated with such RANs. In response, the HSS 118 can return a first UDA message 206A with user data 208 including the requested T-ADS information 210.

As another example, the application server 130 can send the HSS 118 a second UDR message 202B that includes a data reference element 204 indicating that the application server 130 is requesting PS-domain location information 122 and/or CS-domain location information 124 about the UE 102. In some examples, the application server 130 can use separate UDR messages 202 to separately request PS-domain location information 122 and CS-domain location information 124. However, in other examples, the application server 130 can use a single UDR message 202 to request both PS-domain location information 122 and CS-domain location information 124. For instance, the HSS 118 may support a "Notif-Eff" feature or other features that permit the application server 130 to request multiple types of information in a single UDR message 202. In response, the HSS 118 can return a second UDA message 206B, or multiple UDA messages 206B, with user data 208 including the requested PS-domain location information 122 and/or CS-domain location information 124. For example, the CS-domain location information 124 provided by the HSS 118 can include an identifier of a VLR that the terminating UE 102 was most recently associated with.

The location information returned by the HSS 118 in UDA messages 206B can also include a PS-domain age value 126 associated with the PS-domain location information 122 and/or a CS-domain age value 128 associated with the CS-domain location information 124 stored at the HSS 118. For example, if the UE 102 last updated its registration with a CS-domain RAN 106 ten minutes ago, and last updated its registration with a PS-domain RAN 108 thirty minutes ago, and such RANs provided corresponding location updates to the HSS 118, the location information included in UDA messages 206B can include a CS-domain age value 128 indicating that the CS-domain location information 124 is ten minutes old and a PS-domain age value 126 indicating that the PS-domain location information 122 is thirty minutes old. As another example, if the UE 102 has been an area that does not have CS-domain coverage for ten hours and accordingly has not been able to register, or refresh its registration, with a CS-domain RAN 106 during that time, the CS-domain age value 128 of the CS-domain location information 124 returned by the HSS 118 can be ten hours or more.

After the application server 130 receives requested user data 208 from the HSS 118, including T-ADS information 210, PS-domain location information 122, a PS-domain age value 126, CS-domain location information 124, and/or a CS-domain age value 128, the application server 130 can determine whether to initially attempt to route the terminating call invite 132 to the terminating UE 102 via a CS-domain RAN 106 or a PS-domain RAN 108. For example, if the T-ADS information 210 does not indicate that the terminating UE 102 supports IMS PS services for the call, such as IMS Voice Over PS services, the application server 130 can choose to avoid any attempts to connect the incoming call via PS-domain RANs 108 and go directly to attempting to connect the incoming call via a CS-domain RAN 106 as a CS breakout. In this situation, the application server 130 can generate or obtain a CSRN and use the CSRN to attempt to route the terminating call invite 132, or a corresponding call setup message, to the terminating UE 102 via a CS-domain RAN 106.

However, if the T-ADS information 210 does indicate that the terminating UE 102 supports IMS PS services for the call, such as IMS Voice Over PS services, the application server 130 can look at RAT-type information included in the T-ADS information 210 that can identify the RAT-type and/or a corresponding RAN-type that the UE 102 is or was connected to. If the RAT-type information indicates that the terminating UE 102 was connected via a 5G NG-RAN, the application server 130 can attempt to route the terminating call invite 132 to the terminating UE 102 via a PS-domain RAN 108. The application server 130 can also enable the PS retry option 136, such that the application server 130 will use a PS-domain RAN 108 to retry routing the terminating call invite 132 to the terminating UE 102 at least once if the initial attempt over a PS-domain RAN 108 fails. In this situation, because many UEs 102 that can connect to the 5G NG-RAN are likely to be configured to fall back to another PS-domain RAN 108, such as the LTE E-UTRAN, instead of falling back to a 3G RAN or other CS-domain RAN 106, the PS retry option 136 can be more likely to succeed than the CS retry option 134 if a retry attempt is needed.

The application server 130 can also perform an initial attempt to route the terminating call invite 132 to the terminating UE 102 via a PS-domain RAN 108 when the RAT-type information included in the T-ADS information 210 indicates that the terminating UE 102 was connected via the LTE E-UTRAN instead of the 5G NG-RAN. However, because many UEs 102 that can connect to the LTE E-UTRAN are often configured to fall back from the LTE E-UTRAN to a 3G RAN or other CS-domain RAN 106, here either the PS retry option 136 or the CS retry option 134 could be enabled. When the RAT-type information indicates that the terminating UE 102 was connected via the LTE E-UTRAN, the application server 130 can be configured to consider the CS-domain age value 128 of the CS-domain location information 124 returned by the HSS 118 when determining whether to enable the PS retry option 136 or the CS retry option 134.

For example, the application server 130 can be configured with a threshold age value. If the CS-domain age value 128 of the CS-domain location information 124 is less than the threshold age value, the application server 130 can determine that the terminating UE 102 registered with, or updated its location through, a CS-domain RAN 106 sufficiently recently and may therefore be likely to still have CS-domain coverage. Accordingly, the application server 130 can enable the CS retry option 134, such that if the initial attempt to route the terminating call invite 132 to the terminating UE 102 fails via a PS-domain RAN 108, the application server 130 will retry routing the terminating call invite 132 to the terminating UE 102 via a CS-domain RAN 106 at least once.

On the other hand, if the CS-domain age value 128 of the CS-domain location information 124 is equal to or higher than the threshold age value, the application server 130 can determine that the terminating UE 102 last registered with, or updated its location through, a CS-domain RAN 106 too long ago to have sufficient confidence that the terminating UE 102 still has CS-domain coverage. For example, the CS-domain age value 128 of the CS-domain location information 124 being above the threshold age value may indicate that the terminating UE 102 has moved to an area where CS-domain RANs 106 have been decommissioned or are otherwise unavailable, and as such a retry attempt via a PS-domain RAN 108 may be more likely to succeed than a CS-domain retry attempt even if an initial attempt to connect the incoming call via a PS-domain RAN 108 fails. Accordingly, the application server 130 can enable the PS retry option 136, such that if the initial attempt to route the terminating call invite 132 to the terminating UE 102 fails via a PS-domain RAN 108, the application server 130 will retry routing the terminating call invite 132 to the terminating UE 102 via a PS-domain RAN 108 at least once.

In some examples, the threshold age value can be set to eight hours (480 minutes). Many CS-domain RANs 106 request that UEs 102 submit location update information at least every hour, and many mobile switching stations (MSSs) of CS-domain RANs 106 consider a UE 102 to have implicitly detached from the CS-domain RAN 106 if no location updates have been received from the UE 102 within eight hours. However, after eight hours the HSS 118 may still keep user profile data indicating when the UE 102 last provided location updates associated with a CS-domain RAN 106, even if the CS-domain RAN 106 would itself no longer consider the UE 102 to be attached to the CS-domain RAN 106. Accordingly, the threshold age value can also be set to eight hours, and the CS retry option 134 can be disabled and the PS retry option 136 enabled instead when the CS-domain location information 124 is over eight hours old. However, in other examples the threshold age value can be set to any other larger or smaller value, such as one hour, two hours, ten hours, or any other value that is, or is not, tied to any other network timer or time period. For example, the threshold age value can be configurable parameter at the application server 130, such that a network operator or other entity can configure the threshold age value to be any desired value.

In other examples, the application server 130 may enable the CS retry option 134 or the PS retry option 136 based on other factors. For example, if the application server 130 has or obtains information indicating that a terminating UE 102 is already engaged in an active IMS session via a PS-domain RAN 108 when a terminating call invite 132 arrives for the terminating UE 102, the application server 130 can disable the CS retry option 134 and enable the PS retry option 136, and attempt to route the terminating call invite 132 to the terminating UE 102 via a PS-domain RAN 108 with a potential PS-domain retry. If the application server 130 instead has or obtains information indicating that the terminating UE 102 has an active session via a CS-domain RAN 106, that the terminating UE 102 is not registered with the IMS 104, and/or the terminating UE 102 does not have an IMS voice subscription, the application server 130 can move directly to initially attempting to set up the call via a CS-domain RAN 106 and not perform an initial attempt via a PS-domain RAN 108.

As another example, if the application server 130 has or obtains information indicating that the UE 102 is connected to the IMS 104 via a Wi-Fi RAN or an unknown RAN (instead of, for example, a 5G NG-RAN or LTE E-UTRAN), the application server 130 can enable the CS retry option 134 or the PS retry option 136 based on a configurable parameter or preference setting. For example, a telecommunication network provider, application server 130 vendor, or other entity can specifically configure the application server 130 with a preference setting to enable a designated one of the CS retry option 134 or the PS retry option 136 in situations in which the application server 130 discovers that a terminating UE 102 is connected via a Wi-Fi RAN or an unknown RAN.

In some examples, the application server 130 can be configured to determine if a UE 102 is connected via a Wi-Fi RAN or an unknown RAN based on data in messages going to or from the UE 102, rather than from information obtained from the HSS 118. For instance, the application server 130 may be configured analyze a SIP message associated with the UE 102 to find a P-Access-Network-Info (PANI) header that identifies an access network that the UE 102 is connected to. In some examples, the application server 130 can store PANI information in a local cache based on previously analyzed messages associated with a UE 102. When a terminating call invite 132 arrives for a terminating UE 102, but PANI information is not available for the terminating UE 102 in the local cache, or if such PANI information is available in the local cache but, for example, a topmost PANI access type is "IEEE.802" or a topmost PANI access class is "3GPP-WLAN," the application server 130 may determine that the UE 102 is connected via a Wi-Fi RAN or an unknown RAN, and accordingly use the configurable parameter or preference setting to enable a designated one of the CS retry option 134 or the PS retry option 136.

As another example, an application server 130 can be configured to enable the PS retry option 136 and disable the CS retry option 134 if some types of Diameter protocol errors occur in response to attempts by the application server 130 to send a UDR message 202 to the HSS 118. For example, if the application server 130 attempts to send a UDR message 202 to the HSS 118, but a Diameter protocol error occurs that prevents the application server 130 from obtaining requested user data 208 from the HSS 118, the application server 130 can be configured to enable the PS retry option 136 and attempt to route the terminating call invite 132 to the terminating UE 102 via a PS-domain RAN 108 with a potential PS-domain retry. In some examples, the application server 130 can be configured to terminate the session and not attempt to set up the call via either a CS-domain RAN 106 or a PS-domain RAN 108 if certain specific Diameter errors occur, but otherwise enable the PS retry option 136 by default as discussed above if any other type of Diameter protocol error occurs. For instance, the application server 130 can be configured to terminate the session entirely if a 5001 "User Unknown" Diameter error occurs, if a 5002 "Identities Don't Match" Diameter error occurs, if a 5101 "Operation Not Allowed" Diameter error occurs, or if a 5102 "User Data Cannot Be Read" Diameter error occurs, but otherwise be configured to enable the PS retry option 136 if any other type of Diameter protocol error occurs.

As another example, an application server 130 can be configured to enable the PS retry option 136 and disable the CS retry option 134 if the application server 130 has been configured not to query an HSS 118 for T-ADS information 210 or if an HSS 118 has been configured not to provide T-ADS information 210. For instance, if the application server 130 has been configured not to send UDR messages 202 with a data reference element 204 that requests T-ADS information 210, then the application server 130 can be configured to enable the PS retry option 136 and disable the CS retry option 134 by default.

Example Architecture

Figure 3:
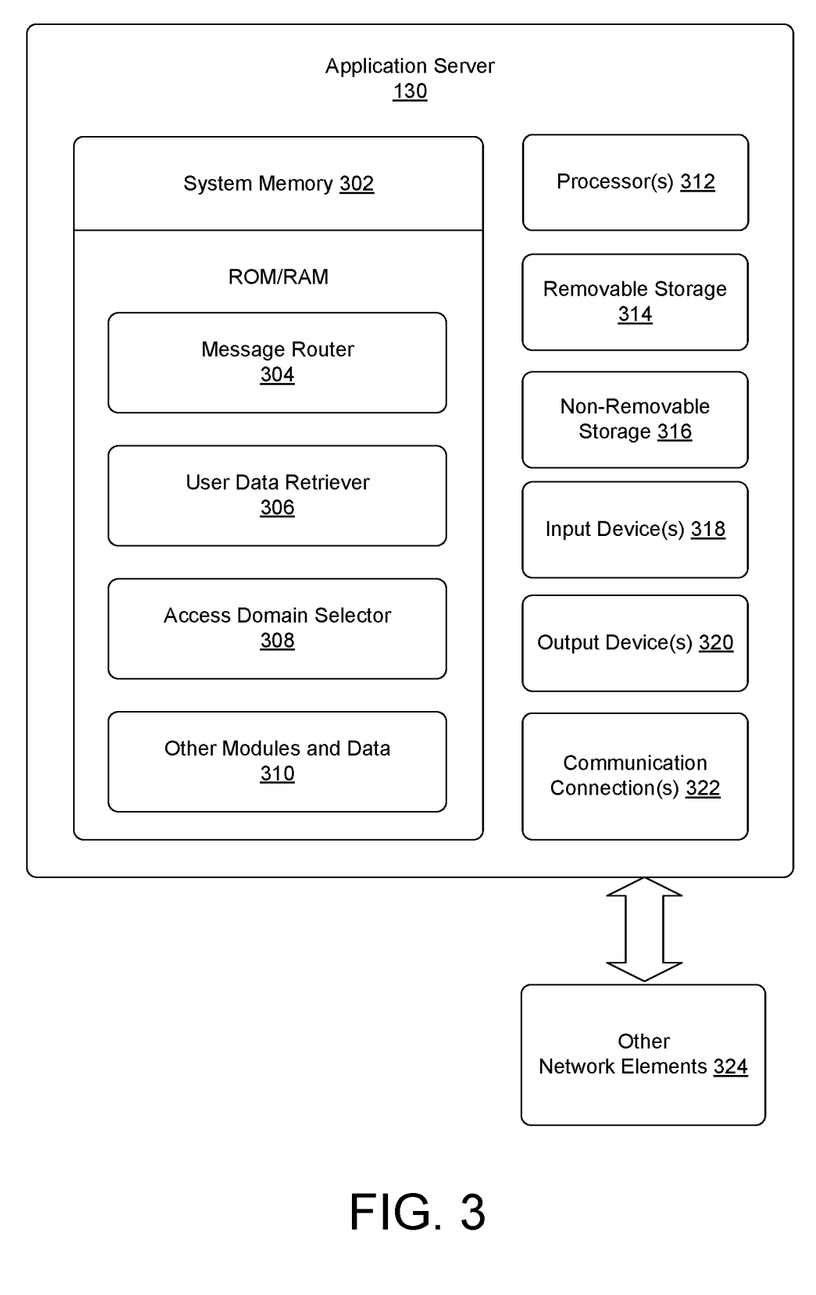
FIG. 3 depicts an example system architecture for an application server.

FIG. 3 depicts an example system architecture for an application server 130. An application server 130 can have a system memory 302 that stores data for the application server 130, including a message router 304, a user data retriever 306, an access domain selector 308, and/or other modules and data 310. As discussed above, an application server 130 can be a TAS and/or a SCC-AS. For example, the application server 130 can be a TAS, but one or more elements shown in FIG. 3, such as a user data retriever 306 and/or an access domain selector 308, can be considered to be an SCC-AS. In other examples, some elements of the application server 130 shown in FIG. 3 can be duplicated and/or distributed among different application servers 130, such as a TAS and a separate SCC-AS.

In various examples, system memory 302 can be volatile (such as RAM), nonvolatile (such as ROM, flash memory, etc.), or some combination of the two. Example system memory 302 can include one or more of RAM, ROM, EEPROM, a Flash Memory, a hard drive, a memory card, an optical storage, a magnetic cassette, a magnetic tape, a magnetic disk storage or another magnetic storage devices, or any other medium.

The message router 304 can receive a terminating call invite 132 for a terminating UE 102, and route, or cause other network elements to route, the terminating call invite 132 toward the terminating UE 102. The message router 304 can route, or cause other network elements to route, a terminating call invite 132 towards a terminating UE 102 over a CS-domain RAN 106 or a PS-domain RAN 108. The message router 304 can also, upon a failed attempt to route a terminating call invite 132 to a terminating UE 102 over a PS-domain RAN 108, perform one or more retries to route the terminating call invite 132 to the terminating UE 102 according to either a CS retry option 134 or a PS retry option 136 that has been enabled by the access domain selector 308.

The user data retriever 306 can obtain user data associated with a UE 102 from an HSS 118. For example, the user data retriever 306 can use the Diameter protocol to send UDR messages 202 to an HSS 118 to request T-ADS information 210, CS-domain location information 124, a CS-domain age value 128, PS-domain location information 122, and/or a PS-domain age value 126 associated with a terminating UE 102, and can receive the requested data in UDA messages 206 from the HSS 118.

The access domain selector 308 can use user data associated with a terminating UE 102 to determine whether to initially attempt to route a terminating call invite 132 to the terminating UE 102 via a CS-domain RAN 106 or a PS-domain RAN 108, and can enable either a CS retry option 134 or a PS retry option 136 that the message router 304 can follow if an initial attempt to route the terminating call invite 132 to the terminating UE 102 via the PS-domain RAN 108 fails.

The access domain selector 308 can select to enable the PS retry option 136 if T-ADS information 210 indicates that the terminating UE 102 was connected to a 5G NG-RAN, if T-ADS information 210 indicates that the terminating UE 102 was connected to an LTE E-UTRAN and a CS-domain age value 128 for CS-domain location information 124 is equal to or greater than a threshold age value, if queries for T-ADS information 210 have been disabled, if the application server 130 determines that the UE 102 is connected via a Wi-Fi access network or an unknown access network and a parameter setting indicates that the PS retry option 136 is to be used in that situation, and/or if certain Diameter protocol errors occur when the user data retriever 306 attempts to request user data from an HSS 118.

The access domain selector 308 can instead select to enable the CS retry option 134 if T-ADS information 210 indicates that the terminating UE 102 was connected to an LTE E-UTRAN and a CS-domain age value 128 for CS-domain location information 124 is less than a threshold age value, or if the application server 130 determines that the UE 102 is connected via a Wi-Fi access network or an unknown access network and a parameter setting indicates that the CS retry option 134 is to be used in that situation.

The access domain selector 308 can also be configured to disable both the CS retry option 134 and PS retry option 136, and/or terminate any attempts to route a terminating call invite 132 to a terminating UE 102 if certain types of Diameter protocol errors occur when the user data retriever 306 attempts to request user data from an HSS 118, such as a 5001 "User Unknown" Diameter error, a 5002 "Identities Don't Match" Diameter error, a 5101 "Operation Not Allowed" Diameter error, or a 5102 "User Data Cannot Be Read" Diameter error.

Additionally, the access domain selector 308 can also be configured to cause an initial attempt to connect an incoming call to a terminating UE 102 via a CS-domain RAN 106 as a CS breakout, instead of via a PS-domain RAN 108 followed by using one of the CS retry option 134 or the PS retry option 136 if needed, when the terminating UE 102 or an associated user is not registered with the IMS 104 or does not have an IMS voice subscription, if the terminating UE 102 already has an active CS-domain session, and/or if T-ADS information 210 retrieved from the HSS 118 indicates that the UE 102 does not support IMS Voice Over PS services or that the UE's support for IMS Voice Over PS services is unknown.

The other modules and data 310 can be utilized by the application server 130 to perform or enable performing any action taken by the application server 130. The other modules and data 310 can include a platform and applications, and data utilized by the platform and applications.

The application server 130 can also include processor(s) 312, removable storage 314, non-removable storage 316, input device(s) 318, output device(s) 320, and/or communication connections 322 for communicating with other network elements 324.

In some embodiments, the processor(s) 312 can be a central processing unit (CPU), a graphics processing unit (GPU), both CPU and GPU, or other processing unit or component known in the art.

The application server 130 can also include additional data storage devices (removable and/or non-removable) such as, for example, magnetic disks, optical disks, or tape. Such additional storage is illustrated in FIG. 3 by removable storage 314 and non-removable storage 316. Computer storage media may include volatile and nonvolatile, removable and non-removable media implemented in any method or technology for storage of information, such as computer readable instructions, data structures, program modules, or other data. System memory 302, removable storage 314 and non-removable storage 316 are all examples of computer-readable storage media. Computer-readable storage media include, but are not limited to, RAM, ROM, EEPROM, flash memory or other memory technology, CD-ROM, digital versatile discs (DVD) or other optical storage, magnetic cassettes, magnetic tape, magnetic disk storage or other magnetic storage devices, or any other medium which can be used to store the desired information and which can be accessed by the application server 130. Any such computer-readable storage media can be part of the application server 130. In various examples, any or all of system memory 302, removable storage 314, and non-removable storage 316, store programming instructions which, when executed, implement some or all of the herein-described operations of the application server 130.

In some examples, the application server 130 can also have input device(s) 318, such as a keyboard, a mouse, a touch-sensitive display, voice input device, etc., and/or output device(s) 320 such as a display, speakers, a printer, etc. These devices are well known in the art and need not be discussed at length here.

The application server 130 can also contain communication connections 322 that allow the application server 130 to communicate with other network elements 324, such as an S-CSCF 120 and/or other CSCFs, elements of PS-domain core networks 110 and/or CS-domain core networks 112 connected to CS-domain RANs 106 and/or PS-domain RANs 108, an HSS 118, and/or other network elements.

Example Operations

Figure 4:
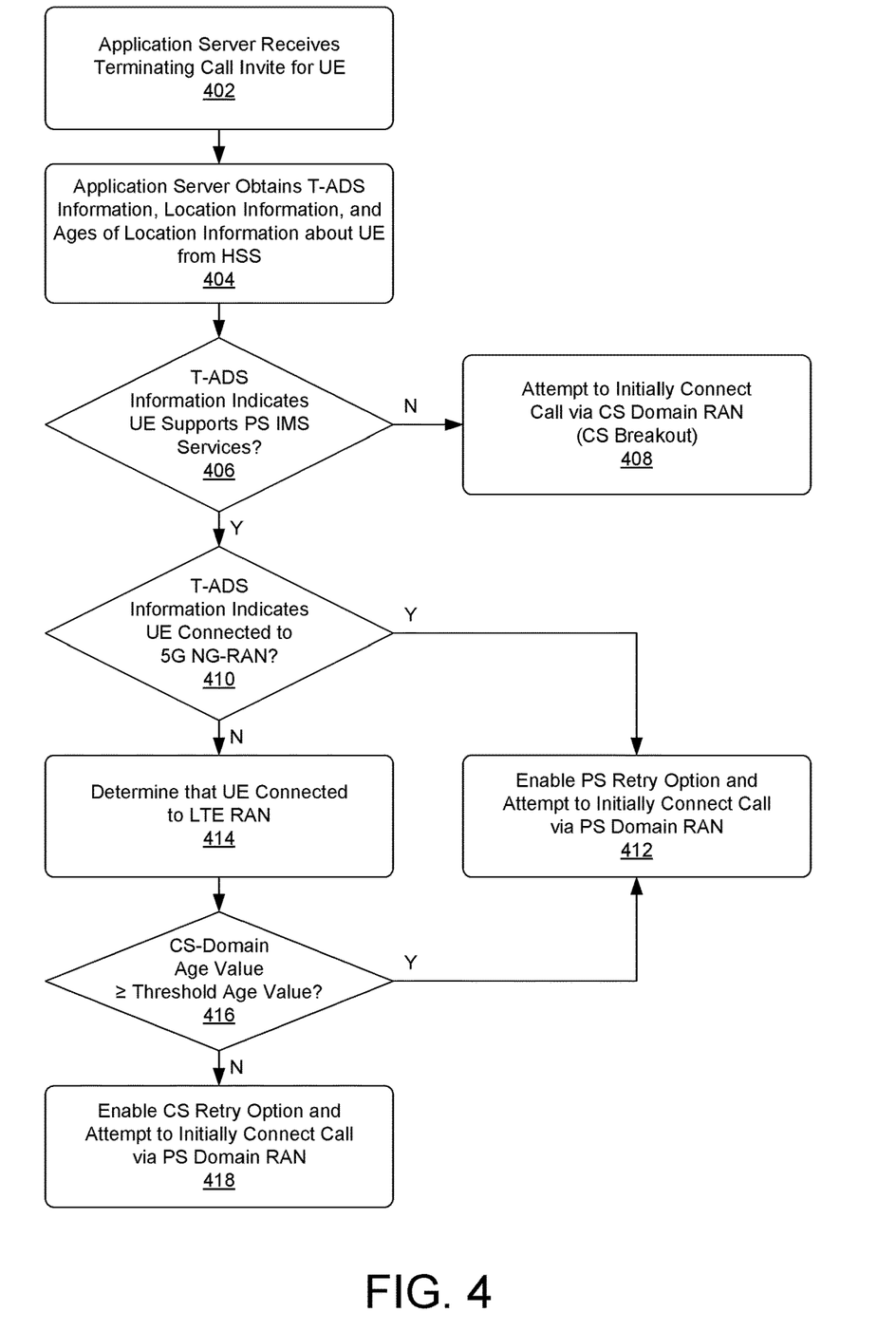
FIG. 4 depicts a flowchart of a method by which an application server can choose a Radio Access Network (RAN) domain type to use during an initial attempt to connect an incoming call to a terminating UE, and/or determine whether to enable a circuit-switched (CS) retry option or a packet-switched (PS) retry option.

FIG. 4 depicts a flowchart of a method by which an application server 130 can choose a RAN domain type to use during an initial attempt to connect an incoming call to a terminating UE 102, and/or determine whether to enable a CS retry option 134 or a PS retry option 136. Here, the application server 130 can be a T-TAS and/or an SCC-AS.

At block 402, the application server 130 can receive a terminating call invite 132 for a terminating UE 102. The terminating call invite 132 can be a SIP INVITE message indicating that there is an incoming call for the terminating UE 102. The terminating call invite 132 can be received by an element, such as an I-CSCF 116 or S-CSCF 120, of a terminating IMS 104 associated with the terminating UE 102, and can be forwarded through the terminating IMS 104 to the application server 130.

At block 404, the application server 130 can obtain T-ADS information 210, CS-domain location information 124, a CS-domain age value 128, PS-domain location information 122, and/or a PS-domain age value 126 associated with the terminating UE 102 from an HSS 118. For example, the application server 130 can request the T-ADS information 210, CS-domain location information 124, a CS-domain age value 128, PS-domain location information 122, and/or a PS-domain age value 126 about the terminating UE 102 by sending one or more UDR messages 202 to the HSS 118 using a Diameter protocol interface, such as a Sh interface. In some examples, the application server 130 may send a first UDR message 202 to the HSS 118 to request the T-ADS information 210, and one or more second UDR messages 202 to request the CS-domain location information 124 and PS-domain location information 122, implicitly or explicitly also requesting a corresponding CS-domain age value 128 and PS-domain age value 126.

The HSS 118 can reply with UDA messages 206 that provides the information requested by each of the UDR messages 202, based on user profile data stored at the HSS 118. For example, in reply to a UDR message 202 requesting T-ADS information 210, the HSS 118 can return a UDA message 206 that includes T-ADS information 210 about one or more RAN-types and/or RAT-types that the terminating UE 102 has been connected to. In reply to a UDR message 202 requesting CS-domain location information 124 and/or PS-domain location information 122 for the terminating UE 102, the HSS 118 can return a UDA message 206 that provides the requested CS-domain location information 124 and/or PS-domain location information 122 for the terminating UE 102. The location information returned by the HSS 118 in one or more UDA messages 206 can also include a CS-domain age value 128 indicating an age of the CS-domain location information 124 stored at the HSS 118, and a PS-domain age value 126 indicating an age of the PS-domain location information 122 stored at the HSS 118. The CS-domain age value 128 and the PS-domain age value 126 can reflect when the HSS 118 was last informed that the terminating UE 102 updated its location in association with a CS-domain RAN 106 and a PS-domain RAN 108, respectively. For example, if the terminating UE 102 updated its location with a PS-domain RAN 108 more recently than the terminating UE 102 updated its location with a CS-domain RAN 106, the CS-domain age value 128 of the CS-domain location information 124 can be greater than the PS-domain age value 126 of the PS-domain location information 122.

At block 406, the application server 130 can determine if the T-ADS information 210 obtained from the HSS 118 indicates that the terminating UE 102 supports packet-switched IMS services associated with the terminating call invite 132. For example, for a voice call, the T-ADS information 210 can indicate that the terminating UE 102 supports IMS Voice Over PS services, does not support IMS Voice Over PS services, or that it is unknown to the HSS 118 whether the terminating UE 102 supports IMS Voice Over PS services.

If at block 406 the application server 130 determines that the T-ADS information 210 does not indicate that the terminating UE 102 supports packet-switched IMS services associated with the terminating call invite 132, for instance if the T-ADS information 210 indicates either that the terminating UE 102 does not support IMS Voice Over PS services or that it is unknown whether the terminating UE 102 supports IMS Voice Over PS services, the application server 130 can move to block 408 and attempt to connect the call to the terminating UE 102 via a CS-domain RAN 106. For example, at block 408, the application server 130 can avoid any attempt to connect the call over a PS-domain RAN 108, and can instead perform a CS breakout during which the application server 130 generates a circuit-switched routing number (CSRN) for the terminating UE 102 or obtains a CSRN for the terminating UE 102 from the HSS 118, and uses the CSRN to attempt to route the call to the terminating UE 102 via a CS-domain RAN 106.

However, if at block 406 the application server 130 determines that the T-ADS information 210 does indicate that the terminating UE 102 supports packet-switched IMS services associated with the terminating call invite 132, for instance if the T-ADS information 210 indicates that the terminating UE 102 does support IMS Voice Over PS services, the application server 130 can move to block 410.

At block 410, the application server 130 can determine whether a RAT-type in the T-ADS information 210 indicates that the terminating UE 102 is connected to a 5G NG-RAN. If the application server 130 determines from the T-ADS information 210 that the terminating UE 102 is connected to a 5G NG-RAN, the application server 130 can move to block 412. At block 412, the application server 130 can enable the PS retry option 136 and disable the CS retry option 134. At block 412, the application server 130 can also perform an initial attempt to route the terminating call invite 132 to the terminating UE 102 via a PS-domain RAN 108. If that initial attempt is unsuccessful, the application server 130 can follow the enabled PS retry option 136 and attempt at least once more to route the terminating call invite 132 to the terminating UE 102 via a PS-domain RAN 108.

However, if at block 410 the application server 130 determines from the T-ADS information 210 that the terminating UE 102 is not connected to a 5G NG-RAN, the application server 130 can instead determine at block 414 that the terminating UE 102 is connected to an LTE E-UTRAN or other type of PS-domain RAN 108. The application server 130 can then move to block 416.

At block 416, the application server 130 can compare the CS-domain age value 128 of the CS-domain location information 124 received from the HSS 118 against a threshold age value. If the CS-domain age value 128 is equal to, or greater than, the threshold age value, the application server 130 can move to block 412 to enable the PS retry option 136, disable the CS retry option 134, perform an initial attempt to route the terminating call invite 132 to the terminating UE 102 via a PS-domain RAN 108. If that initial attempt is unsuccessful, the application server 130 can follow the enabled PS retry option 136 and attempt at least once more to route the terminating call invite 132 to the terminating UE 102 via a PS-domain RAN 108. Here, because the CS-domain location information 124 is relatively old, such that the CS-domain age value 128 is equal to, or greater than, the threshold age value, it may be unlikely that the terminating UE 102 has CS-domain coverage and thus the PS retry option 136 may be more likely to be successful than the CS retry option 134.

If, however, application server 130 determines at block 416 that the CS-domain age value 128 of the CS-domain location information 124 is less than the threshold age value, the application server 130 can move to block 418. At block 418, the application server 130 can enable the CS retry option 134, disable the PS retry option 136, and perform an initial attempt to route the terminating call invite 132 to the terminating UE 102 via a PS-domain RAN 108. If that initial attempt is unsuccessful, the application server 130 can follow the enabled CS retry option 134 and attempt at least once to route the terminating call invite 132 to the terminating UE 102 via a CS-domain RAN 106.

In some examples, the application server 130 can also reach blocks 408, 412, or 418 in other ways. For an example, in some cases the application server 130 can directly move to performing a CS breakout at block 408 if the terminating UE 102 or an associated user is not registered with the IMS 104 or does not have an IMS voice subscription, if the terminating UE 102 already has an active CS-domain session, and/or if T-ADS information 210 retrieved from the HSS 118 indicates that the UE 102 does not support IMS Voice Over PS services or that the UE's support for IMS Voice Over PS services is unknown.

As another example, in some cases the application server 130 can directly move to enabling a PS retry option 136 and performing an initial attempt to route the terminating call invite 132 to the terminating UE 102 via a PS-domain RAN 108, with a potential PS retry, at block 412 if queries for T-ADS information 210 have been disabled, if the application server 130 determines that the UE 102 is connected via a Wi-Fi access network or an unknown access network and a parameter or preference setting indicates that the PS retry option 136 is to be used in that situation, and/or if certain Diameter protocol errors occur when the application server 130 attempts to request user data from an HSS 118.

As another example, in some cases the application server 130 can directly move to enabling a CS retry option 134 and performing an initial attempt to route the terminating call invite 132 to the terminating UE 102 via a PS-domain RAN 108, with a potential CS retry, at block 418 if the application server 130 determines that the UE 102 is connected via a Wi-Fi access network or an unknown access network and a parameter or preference setting indicates that the CS retry option 134 is to be used in that situation.

CONCLUSION

Although the subject matter has been described in language specific to structural features and/or methodological acts, it is to be understood that the subject matter is not necessarily limited to the specific features or acts described above. Rather, the specific features and acts described above are disclosed as example embodiments.

What is claimed is:

1. An application server of an Internet Protocol Multimedia Subsystem (IMS), comprising:
   one or more processors;
   memory storing computer-executable instructions that, when executed by the one or more processors, cause the application server to perform operations comprising:
   receiving a terminating call invite for a terminating user equipment (UE);
   obtaining, from a Home Subscriber Server (HSS), Terminating Access Domain Selection (T-ADS) information and circuit-switched (CS) domain location information associated with the terminating UE;
   enabling a packet-switched (PS) retry option in response to determining that the T-ADS information indicates that the terminating UE is connected to a fifth generation (5G) radio access network;
   enabling the PS retry option in response to determining that the T-ADS information indicates that the terminating UE is connected to a Long-Term Evolution (LTE) radio access network and that a CS-domain age value of the CS-domain location information is equal to or greater than a threshold age value; and
   enabling a CS retry option in response to determining that the terminating UE is connected to the LTE radio access network and that the CS-domain age value of the CS-domain location information is less than the threshold age value.

2. The application server of claim 1, wherein the operations further comprise:
   performing a first attempt to route the terminating call invite to the terminating UE via a PS-domain radio access network;
   determining that the first attempt failed; and
   performing at least one retry attempt to route the terminating call invite to the terminating UE,
   wherein the at least one retry attempt is performed via the PS-domain radio access network or a different PS-domain radio access network when the PS retry option is enabled, or is performed via a CS-domain radio access network when the CS retry option is enabled.

3. The application server of claim 1, wherein the application server obtains the T-ADS information from the HSS by sending a user data request message to the HSS that includes a data reference element specifying the T-ADS information, and receiving a user data answer message from the HSS that includes the T-ADS information.

4. The application server of claim 1, wherein the application server obtains the CS-domain location information from the HSS by sending a user data request message to the HSS that includes a data reference element specifying the CS-domain location information, and receiving a user data answer message from the HSS that includes the CS-domain location information.

5. The application server of claim 4, wherein the data reference element or a second data reference element also indicates that the user data request message is requesting PS-domain location information about the terminating UE, and wherein the user data answer message from the HSS also includes the PS-domain location information.

6. The application server of claim 1, wherein the operations further comprise enabling the PS retry option in response to determining that queries for the T-ADS information are disabled.

7. The application server of claim 1, wherein the operations further comprise enabling the PS retry option in response to determining that the terminating UE is connected via a Wi-Fi access network or an unknown access network.

8. The application server of claim 7, wherein the application server determines that the terminating UE is connected via the Wi-Fi access network or the unknown access network based on an absence of P-Access-Network-Info (PANI) header information for the terminating UE in a local cache or the PANI header information for the terminating UE in the local cache being associated with the Wi-Fi access network.

9. The application server of claim 1, wherein the operations further comprise enabling the CS retry option in response to determining that the terminating UE is connected via a Wi-Fi access network or an unknown access network.

10. The application server of claim 1, wherein the operations further comprise enabling the PS retry option in response to determining that one of a set of Diameter protocol errors occurs upon an attempt by the application server to obtain the T-ADS information or the CS-domain location information from the HSS.

11. The application server of claim 1, wherein the operations further comprise attempting route the terminating call invite to the terminating UE via a CS-domain radio access network when the T-ADS information does not indicate that the terminating UE supports IMS Voice Over PS services.

12. A method, comprising:
receiving, by an application server of an Internet Protocol Multimedia Subsystem (IMS), a terminating call invite for a terminating user equipment (UE):
obtaining, by the application server from a Home Subscriber Server (HSS), Terminating Access Domain Selection (T-ADS) information and circuit-switched (CS) domain location information associated with the terminating UE; and
enabling, by the application server, a packet-switched (PS) retry option or a CS retry option,
wherein the application server enables the PS retry option when the T-ADS information indicates that the terminating UE is connected to a fifth generation (5G) radio access network, or when the T-ADS information indicates that the terminating UE is connected to a Long-Term Evolution (LTE) radio access network and that a CS-domain age value of the CS-domain location information is equal to or greater than a threshold age value, and
wherein the application server enables the CS retry option when the T-ADS information indicates that the terminating UE is connected to the LTE radio access network and that the CS-domain age value of the CS-domain location information is less than the threshold age value.

13. The method of claim 12, further comprising:
attempting, by the application server, an initial attempt to route the terminating call invite to the terminating UE via a PS-domain radio access network;
determining, by the application server, that the initial attempt has failed; and
attempting, by the application server, to route the terminating call invite to the terminating UE via the PS-domain radio access network or a different PS-domain radio access network at least one additional time according to the PS retry option.

14. The method of claim 12, wherein the application server obtains the T-ADS information from the HSS by sending a user data request message to the HSS that includes a data reference element specifying the T-ADS information, and receiving a user data answer message from the HSS that includes the T-ADS information.

15. The method of claim 12, wherein the application server obtains the CS-domain location information from the HSS by sending a user data request message to the HSS that includes a data reference element specifying the CS-domain location information, and receiving a user data answer message from the HSS that includes the CS-domain location information.

16. The method of claim 15, wherein the data reference element or a second data reference element also indicates that the user data request message is requesting PS-domain location information about the terminating UE, and wherein the user data answer message from the HSS also includes the PS-domain location information.

17. One or more non-transitory computer-readable media storing computer-executable instructions that, when executed by one or more processors of an application server of an Internet Protocol Multimedia Subsystem (IMS), cause the application server to perform operations comprising:
receiving a terminating call invite for a terminating user equipment (UE);
obtaining, from a Home Subscriber Server (HSS), Terminating Access Domain Selection (T-ADS) information and circuit-switched (CS) domain location information associated with the terminating UE;
enabling a packet-switched (PS) retry option in response to determining that the T-ADS information indicates that the terminating UE is connected to a fifth generation (5G) radio access network;
enabling the PS retry option in response to determining that the T-ADS information indicates that the terminating UE is connected to a Long-Term Evolution (LTE) radio access network and that a CS-domain age value of the CS-domain location information is equal to or greater than a threshold age value; and
enabling a CS retry option in response to determining that the terminating UE is connected to the LTE radio access network and that the CS-domain age value of the CS-domain location information is less than the threshold age value.

18. The one or more non-transitory computer-readable media of claim 17, wherein the operations further comprise:
performing a first attempt to route the terminating call invite to the terminating UE via a PS-domain radio access network;
determining that the first attempt failed; and
performing at least one retry attempt to route the terminating call invite to the terminating UE,
wherein the at least one retry attempt is performed via the PS-domain radio access network or a different PS-domain radio access network when the PS retry option is enabled, or is performed via a CS-domain radio access network when the CS retry option is enabled.

19. The one or more non-transitory computer-readable media of claim 17, wherein the operations further comprise enabling the PS retry option or the CS retry option in response to determining that the terminating UE is connected via a Wi-Fi access network or an unknown access network, based on a preference setting configured at the application server.

20. The one or more non-transitory computer-readable media of claim 17, wherein the operations further comprise attempting route the terminating call invite to the terminating UE via a CS-domain radio access network when the T-ADS information does not indicate that the terminating UE supports IMS Voice Over PS services.

* * * * *